Patented Jan. 13, 1925.

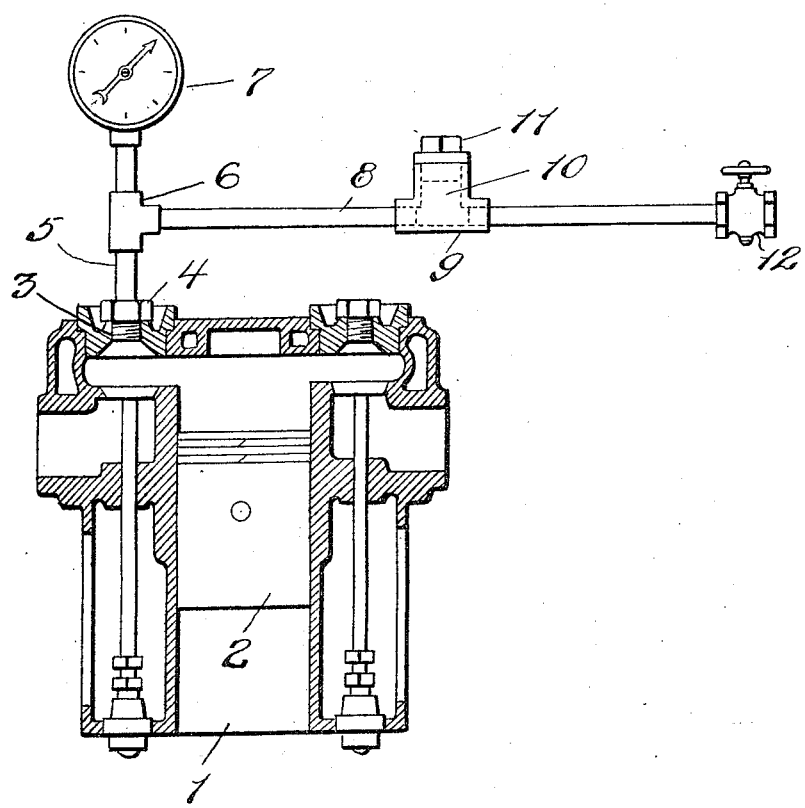

1,522,676

UNITED STATES PATENT OFFICE.

OSCAR W. GERLEMAN, OF ST. LOUIS, MISSOURI.

PISTON-RING AND CYLINDER TESTING AND TREATING DEVICE.

Application filed November 3, 1923. Serial No. 672,480.

*To all whom it may concern:*

Be it known that OSCAR W. GERLEMAN, a citizen of the United States of America, residing at 110 South Tenth Street, in the city of St. Louis and State of Missouri, has invented certain new and useful Improvements in Piston-Ring and Cylinder Testing and Treating Devices, of which the following is a specification.

The object of my invention is to produce a device for testing piston rings and cylinders and so treating them that in the operation of the piston ring on the piston in the cylinder, there will be practically no loss of compression.

A further object is to produce a method of treating piston rings and cylinders which will produce the same result. This invention is an improvement on a former invention of applicant Number 1,398,775 for treating pistons, piston rings and cylinders.

Inasmuch as the pressure produced by an explosion in the cylinder of an internal combustion motor varies directly with the pressure to which the gas is compressed before it is exploded, it is highly advantageous to procure high compressions.

In a multi-cylinder engine it is also of extreme importance to have the compressions of all the cylinders equally high. The difficulty does not exist in producing the compression but in maintaining it after it is produced. The piston ring is designed to prevent loss of compression. In the conventional motor, this is accomplished only approximately. What actually happens is that the compressed gases leak by the piston ring into the crank case thereby lessening the compression and hence the power, and that since leakage varies in the different cylinders, the uniformity of compression is not maintained.

Furthermore, the oil leaks from the crank case by the piston rings into the cylinders and combustion chamber in the conventional motor, causing foul plugs, the necessity of grinding valves and reboring cylinders. Likewise, the unburned gasoline from the cylinder leaks by the piston into the crank case, making the oil unfit for lubricating purposes in the conventional motor.

In a former invention of mine, I provided a method of preventing compression losses, preventing the oil from leaking by the piston rings, preventing the necessity of valve grinding and carbon cleaning in the cylinders, preventing a mixture of gasoline with the oil in the crank case, without any mechanical appliance or adding any foreign matter to the gasoline or overhauling or mechanically changing the motor. That was accomplished in the following manner: The ignition of the engine is made inoperative. The spark plug is removed and through the spark plug opening a small amount of pure flake graphite is inserted when the cylinder is at the beginning of its compression stroke. A compressometer is then inserted in place of the spark plug. The crank shaft is then manually revolved so as to move the piston in its upward or compression stroke almost to the end, but not sufficiently to open the exhaust port of the cylinder. The piston is then moved down to the beginning of its upward or compression stroke and the process continued until the compression is registered on the compressometer.

Only the purest form of flake graphite may be used and only in small amounts. If too much is used, the piston will be caused to stick or freeze to the cylinder. The amount varies with the size and condition of the cylinder and the piston rings. Usually one application is sufficient. The same operation is repeated with each cylinder until all of the compressions are alike and maximum pressure which is particularly obtainable in such engines is obtained.

The reasons for these results are resident in the fact that when the graphite is inserted as described, it is held in suspension in the air. Movement of the piston rubs the graphite into the cylinder walls and into the external surfaces of the piston rings, forming an absolutely smooth and solid surface on both. Within the range of temperature in such cylinders as described, the graphite will act as a perfect lubricant, decreasing the coefficient of friction between the cylinder wall and the piston rings and at the same time preventing leakage of the gases, or oil, or gasoline by the piston.

It will be observed that by the operation just described, considerable amount of work is necessary in that the crank shaft must be manually rocked. Garage men and mechanics have objected to the work necessary to do this rocking in order to accomplish the desired result. The object of my present invention is, therefore, to produce the same or better results than above indicated and to accomplish them without manual labor.

With this and other objects in view, my invention has relation to certain novel features of construction and arrangement of parts as will be hereinafter more fully described, pointed out in the claim and illustrated in the drawings, in which The single figure is a schematic sectional elevation of the top of a cylinder of a gasoline engine, together with its piston and the admission and exhaust valves, to which my device has been attached.

Numeral 1 designates the conventional cylinder, numeral 2 the conventional piston, and numeral 3 the spark plug opening. All of this structure is conventional including the valves etc, which I have not specifically described. I have shown both valves in a closed or seated position for a reason to be subsequently described. My device consists of the pipe union 4 which is screwed into the spark plug opening 3. The pipe 5 is secured in threaded engagement in the pipe union 4 and has secured thereto at an intermediate position the T 6 and the compressometer 7 secured thereto at its outer end. The pipe 8 is screwed into the T 6 and has the T 9 secured therein in an intermediate position. In the T 9 is formed the well 10. Numeral 11 designates a threaded plug which is secured in threaded engagement with the upper end of the T 9 above the well 10. Numeral 12 designates an air valve such as is used on inner tubes and is of conventional structure. The operation of my device is as follows: About three grains of pure flake graphite are inserted in the well 10 by removing the plug 11. The plug 11 is then secured in position. The spark plug not shown is removed and the pipe union 4 screwed into the top of the cylinder. A source of compressed air not shown is attached to the valve 12. When an air pressure of, for example, one hundred pounds forces the air through the valve 12, it blows the graphite from the well 10 through the pipes 8 and 5, the union 4, and the hole 3 into the top of the cylinder. The valves being closed the air and graphite cannot be blown out through the valve. The graphite is held in suspension in the air. Gradually the air will leak by the piston rings and deposit the suspended graphite on the external surface of the piston rings and on the wall of the cylinder. By means of the compressometer 7 the pressure which the piston will permit can be registered. This operation may be repeated as many times as are necessary to produce the desired effect.

What I claim and mean to secure by Letters Patent is—

In a device of the character described, a pipe, a well and a valve, the well operatively secured in said pipe, the valve secured to the external end of said valve, a compressometer operatively secured to said pipe and means attached to said pipe for securing it to the firing chamber of a motor.

In testimony whereof I affix my signature.

OSCAR W. GERLEMAN.